United States Patent
Celis et al.

(10) Patent No.: US 9,098,343 B2
(45) Date of Patent: Aug. 4, 2015

(54) METHOD AND SYSTEM FOR MANAGING ALLOCATION OF TASKS TO BE CROWDSOURCED

(71) Applicant: Xerox Corporation, Norwalk, CT (US)

(72) Inventors: Laura E Celis, Bangalore (IN); Koustuv Dasgupta, Bangalore (IN)

(73) Assignee: XEROX CORPORATION, Norwalk, CT (US)

( * ) Notice: Subject to any disclaimer, the term of this patent is extended or adjusted under 35 U.S.C. 154(b) by 181 days.

(21) Appl. No.: 13/706,723

(22) Filed: Dec. 6, 2012

(65) Prior Publication Data

US 2014/0165071 A1    Jun. 12, 2014

(51) Int. Cl.
G06F 9/46    (2006.01)
G06F 15/173  (2006.01)
G06F 9/50    (2006.01)

(52) U.S. Cl.
CPC ............................... *G06F 9/5066* (2013.01)

(58) Field of Classification Search
None
See application file for complete search history.

(56) References Cited

U.S. PATENT DOCUMENTS

| | | | |
|---|---|---|---|
| 7,793,296 B2 | 9/2010 | DiGregorio | |
| 2009/0070211 A1 | 3/2009 | Gonen | |
| 2009/0276519 A1* | 11/2009 | Alimi et al. | 709/224 |
| 2010/0121624 A1 | 5/2010 | Roy et al. | |
| 2011/0145156 A1* | 6/2011 | Feng et al. | 705/301 |
| 2011/0246148 A1* | 10/2011 | Gupta et al. | 703/2 |
| 2012/0016642 A1 | 1/2012 | Li et al. | |
| 2012/0102369 A1* | 4/2012 | Hiltunen et al. | 714/48 |
| 2013/0074077 A1* | 3/2013 | Miller et al. | 718/100 |
| 2013/0179170 A1* | 7/2013 | Cath et al. | 704/260 |
| 2014/0108656 A1* | 4/2014 | Salinca et al. | 709/226 |
| 2014/0136254 A1* | 5/2014 | Das et al. | 705/7.14 |

OTHER PUBLICATIONS

Minder et al. "CrowdManager—Combinatorial Allocation and Pricing of Crowdsourcing Tasks with Time Constraints". Workshop on Social Computing and User Generated Content, Jun. 7, 2012, Valencia, Spain.*

Nicolo Cesa-Bianchi and Paul Fischer titled "Finite-time regret bounds for the multiarmed bandit problem." Proceedings of the International Conference on Machine Learning (ICML), pp. 100-108, 1998.

Aleksandrs Slivkins and Eli Upfal, titled "Adapting to a Changing Environment: the Brownian Restless Bandits", Conference on Learning Theory (COLT), 2008.

[Auer et. al. 2002 ] Peter Auer, Nicolo Cesa-Bianchi, Yaov Freund, and Robert E. Schapire, \The non-stochastic multi-armed bandit problem., in SIAM journal on computing, 32:48-77, 2002.

Elisa Celis and Koustuv Dasgupta, "Changing Crowds as Crowds Change: Adaptive Selection of Crosdsourcing Options," Aug. 30, 2012.

(Continued)

*Primary Examiner* — Adam Lee
(74) *Attorney, Agent, or Firm* — Jones Robb, PLLC

(57) ABSTRACT

A method and system for managing allocation of tasks to a plurality of crowdsourcing arms is disclosed. The method includes distributing a set of tasks to the plurality of crowdsourcing arms based on a predefined condition. In response to the distributing, a verification data corresponding to the plurality of crowdsourcing arms is received after a predefined interval. The predefined condition is then updated based on the verification data received. Further, the set of tasks among the plurality of crowdsourcing arms are redistributed based on the updated predefined condition.

18 Claims, 4 Drawing Sheets

(56) References Cited

OTHER PUBLICATIONS

[Celis et. al. 2012] Notes by L. Elisa Celis, Course by Ofer Dekel and Brendan McMahan, \Lecture 14: Online Learning: Bandits with Expert Advice Analysis of EXP4*, http://www.cs.washington.edu/education/courses/cse599s/12sp/scribes/lec14.pdf.

[Gittins 1979] J. C. Gittins, \Bandit Processes and Dynamic Allocation Indices, Journal of the Royal Statistical Society. Series B (Methodological), vol. 41, No. 2., pp. 148177, 1979.

[Kuleshov & Precup 2000] Volodymyr Kuleshov and Doina Precup, \Algorithms for the multi-armed bandit problem, Journal of Machine Learning Research, 1-48, 2000.

[Ho & Vaughan 2012] Chien-Ju Ho and Jennifer Wortman Vaughan, \Online Task As-signment in Crowdsourcing Markets, Conference for the Association for the Advancement of Articial Intelligence (AAAI), 2012.

[McMahan & Streeter 2009] Brendan McMahan and Matthew Streeter, \Tighter Bounds for Multi-Armed Bandits with Expert Advice, COLT, 2009.

[Robbins 1952] H. Robbins, \Some Aspects of the Sequential Design of Experiments Bulletin of the American Math Society, vol. 58, 1952.

[Tran-Thanh et. al. 2012] Long Tran-Thanh and Sebastian Stein and Alex Rogers and Nicholas R. Jennings, \Ecient Crowdsourcing of Unknown Experts using Multi-Armed Bandits, European Conference on Arti__cial Intelligence (ECAI), 2012.

U.S. Appl. No. 13/350,965, filed Jan. 16, 2012, "Feedback Based Technique Towards Total Completion of Tasks in Crowdsourcing" Shourya Roy et al.

* cited by examiner

METHOD AND SYSTEM FOR MANAGING ALLOCATION OF TASKS TO BE CROWDSOURCED

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are related to crowdsourcing. More particularly, the presently disclosed embodiments are related to a method and system for managing allocation of tasks to be crowdsourced.

BACKGROUND

In an environment in which business tasks are to be outsourced or crowdsourced, finding a crowdsourcing platform is often a tedious and cumbersome manual job. In general, systems are designed that enable businesses to do this by using benchmarked data to select the best solution from a range of options (i.e., given a list of desired parameters, preferences, or a combination thereof) that satisfies the necessary business requirements. However, this implicitly assumes that the best option(s) can be predicted with the benchmarked data which is a potentially problematic assumption. Furthermore, it assumes the best option(s) are static (i.e., that they are defined by a set of parameters such as cost, accuracy, and/or time to completion) which can be measured at one time and will remain unchanged. In reality, there may be much variation since the available options are highly dynamic with entry of new crowdsourcing platforms, platform improvements and/or pricing changes in the crowdsourcing platforms. This variation occurs not only across platforms, but also within a single platform depending on parameters such as time of day, day of the week, and even current events. In order to provide the best service it is imperative to have flexibility and adapt to the changing business requirements so that the best service is offered at all times, something that the state-of-the-art does not offer.

SUMMARY

According to embodiments illustrated herein, there is provided a computer-implemented method for managing allocation of tasks to a plurality of crowdsourcing arms, the plurality of crowdsourcing arms corresponds to crowdsourcing platforms, setting combinations in one or more of the crowdsourcing platforms, or combinations thereof. The computer-implemented method includes distributing a set of tasks to the plurality of crowdsourcing arms based on a predefined condition. In response to the distributing, a verification data corresponding to the plurality of crowdsourcing arms is received after a predefined interval. The predefined condition is then updated based on the verification data received. Further, the set of tasks among the plurality of crowdsourcing arms are redistributed based on the updated predefined condition.

According to embodiments illustrated herein, there is provided a system for managing allocation of tasks to a plurality of crowdsourcing arms, the plurality of crowdsourcing arms corresponds to crowdsourcing platforms, setting combinations in one or more of the crowdsourcing platforms. The system includes a distribution module, a verification module, and a reward module. The distribution module is configured for distributing and re-distributing a set of tasks to among the plurality of crowdsourcing arms based on a predefined condition or an updated predefined condition. The verification module is configured for receiving, after a predefined interval has elapsed, a verification data corresponding to the plurality of crowdsourcing arms in response to the distributing/re-distributing. The reward module is configured for updating the predefined condition based on the verification data.

According to embodiments illustrated herein, there is provided a computer program product for use with a computer. The computer program product includes a computer-usable data carrier storing a computer-readable program code embodied therein for managing allocation of tasks to a plurality of crowdsourcing arms, the plurality of crowdsourcing arms corresponds to crowdsourcing platforms, setting combinations in one or more of the crowdsourcing platforms. The computer-readable program code includes program instruction means for distributing a set of tasks to a plurality of crowdsourcing arms based on a predefined condition. The computer-readable program code includes program instruction means receiving, after a predefined interval has elapsed, a verification data corresponding to the plurality of crowdsourcing arms in response to distributing. The computer-readable program code also includes a program instruction means for updating the predefined condition based on the verification data. The computer-readable program code further includes a program instruction means for re-distributing the set of tasks among the plurality of crowdsourcing arms based on the updated predefined condition.

BRIEF DESCRIPTION OF DRAWINGS

The accompanying drawings illustrate various embodiments of systems, methods, and various other aspects of the invention. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
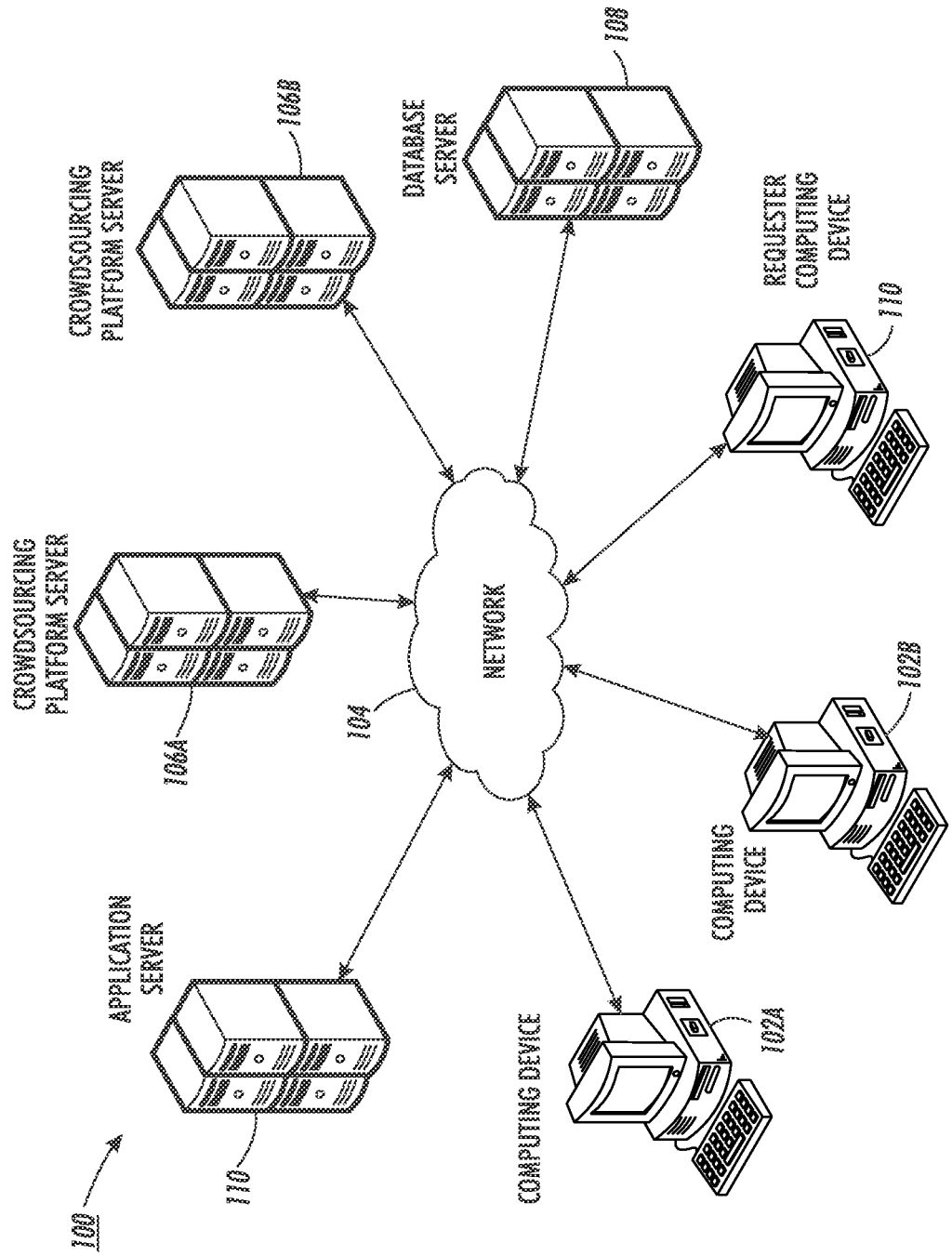
FIG. 1 is a block diagram illustrating a system environment, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "network" refers to a medium that interconnects various computing devices, crowdsourcing platform servers, and a database server. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "computing device" refers to a computer, a device including a processor/microcontroller and/or any other electronic component, or a device or a system that performs one or more operations according to one or more programming instructions. Examples of the computing device include, but are not limited to, a desktop computer, a laptop, a personal digital assistant (PDA), a tablet computer (e.g., iPad®, Samsung Galaxy Tab®) and the like. The computing device is capable of communicating with the crowdsourcing platform servers and the database server by means of the network (e.g., using wired or wireless communication capabilities).

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

"A crowdsourcing platform" refers to a business application, wherein a broad, loosely defined external group of people, community, or organization provides solutions as outputs for any specific business processes received by the application as input. In an embodiment, the business application can be hosted online on a web portal (e.g., the crowdsourcing platform servers). Various examples of the crowdsourcing platforms include, but are not limited to, Amazon Mechanical Turk or Crowd Flower.

A "crowdsourcing arm" refers to one or more crowdsourcing platforms, one or more setting combinations in a single crowdsourcing platform, or it can be composite in nature consisting of any combination of one or more crowdsourcing platforms and one or more setting combinations. Each crowdsourcing arm provides a solution to a business task.

"Crowdworkers" refer to a worker or a group of workers that may perform one or more tasks that generate data that contribute to a defined result, such as proofreading part of a digital version of an ancient text or analyzing a small quantum of a large volume of data. According to the present disclosure, the crowdsourced workforce includes, but is not limited to, a satellite centre employee, a rural BPO (Business Process Outsourcing) firm employee, a home-based employee, or an internet-based employee. Hereinafter, "crowdsourced workforce," "crowdworker," "crowd workforce," and "crowd" may be interchangeably used.

A "predefined condition" refers to a selection of the one or more crowdsourcing arms from the one or more crowdsourcing platforms based on a statistical data or a benchmark data about the one or more crowdsourcing platforms.

A predefined interval refers to a time interval during which the one or more tasks are assigned to one or more crowdsourcing arms and are waiting to be completed or a task interval defining number of tasks after completion of which verification data is to be collected.

A "reward" refers to a function of cost, accuracy, time to completion, and other relevant measurable parameters calculated on a collection of data received from the one or more crowdsourcing platforms associated with each of the plurality of crowdsourcing arms. The collection of data corresponds to the performance of the one or more tasks assigned to the one or more crowdsourcing arms.

FIG. 1 is a block diagram illustrating a system environment 100 in accordance with at least one embodiment. Various embodiments of the methods and systems for managing allocation of one or more business tasks (hereafter referred to as tasks) to a plurality of crowdsourcing arms are implementable in the system environment 100. The system environment 100 includes computing devices (102a, 102b; hereinafter referred to as community 102), a network 104, crowdsourcing platform servers (106a, 106b) (hereinafter referred to as crowdsourcing platform servers 106), a database server 108, an application server 110, and a requester computing device 112.

Although FIG. 1 shows only one type of computing device for simplicity, it will be apparent to a person having ordinary skill in the art that the disclosed embodiments can be implemented for a variety of computing devices including, but not limited to, a desktop computer, a laptop, a personal digital assistant (PDA), a tablet computer (e.g., iPad®, Samsung Galaxy The), and the like.

The crowdsourcing platform servers 106 are devices or computers that hosts one or more crowdsourcing platforms and are interconnected to the community 102 over the network 104. The crowdsourcing platforms accepts one or more tasks from the community 102 and sends a verification data 230 (shown in FIG. 2) corresponding to the one or more tasks to the community 102. Examples of the verification data 230 include, but are not limited to, cost, accuracy, and time to completion.

The community 102 and the crowdsourcing platform servers 106 are interconnected, wherein the crowdsourcing platforms request for solutions to the one or more tasks from the community 102. In an embodiment, users of the community 102 (hereinafter referred to as crowdworker or crowd or crowd workforce).

In an embodiment, a user of the requester computing device 112 (hereinafter, referred to as a requester) may submit various tasks to be crowdsourced.

In an embodiment, the application server 110 hosts an application/tool for managing the distribution of tasks to one or more crowdsourcing arms. In this case, the requester accesses the application server 110 over the network 104 to submit the tasks to be crowdsourced (may be through a web based interface).

In another embodiment, the crowdsourcing platform servers 106 host an application/tool for managing the distribution of tasks. In this case, the requester accesses one or more of the crowdsourcing platform servers 106 hosting the application over the network 104 to submit the tasks to be crowdsourced (may be through a web based interface).

In yet another embodiment, a client application installed on the requester 112 facilitates the distribution of the tasks to be crowdsourced.

Figure 2:
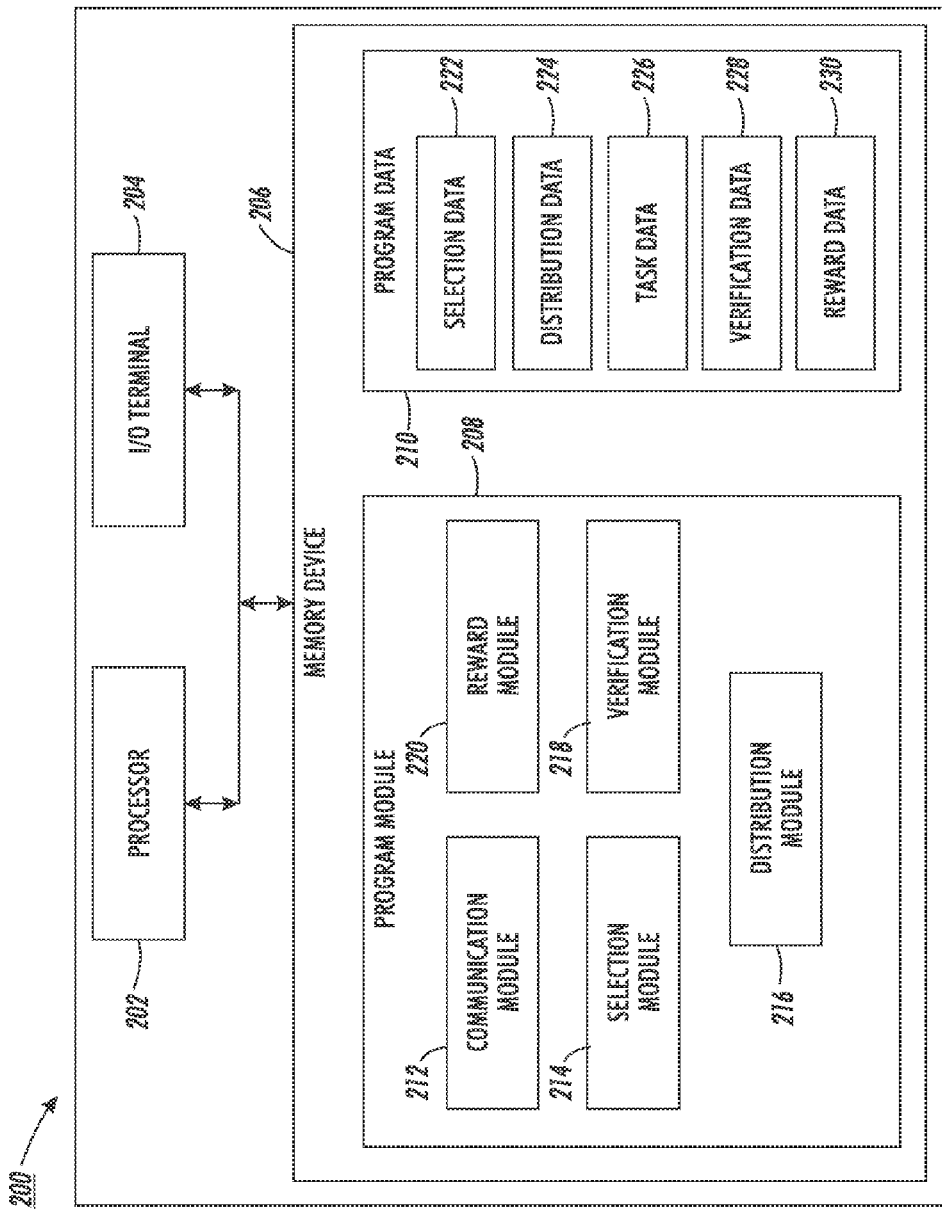
FIG. 2 is a block diagram illustrating a system, in accordance with at least one embodiment.

FIG. 2 is a block diagram illustrating a system 200 in accordance with at least one embodiment. The system 200 may correspond to any of the crowdsourcing platform servers 106, the application server 110, and the requester 112. The system 200 includes a processor 202, an input/output (I/O) terminal 204, and a memory 206. The memory 206 includes a program module 208 and a program data 210. The program module 208 includes a communication module 212, a selection module 214, a distribution module 216, a verification module 218, and a reward module 220. The program data 210 includes a selection data 222, a distribution data 224, a task data 226, the verification data 228, and a reward data 230. In an embodiment, the memory 204 and the processor 202 may be coupled to the I/O terminal for display and/or one or more inputs.

The processor 202 executes a set of instructions stored in the memory 204 to perform one or more operations. The processor 202 can be realized through a number of processor technologies known in the art. Examples of the processor 202 include, but are not limited to, an X86 processor, a RISC processor, an ASIC processor, a CISC processor, or any other processor. In an embodiment, the processor 202 includes a Graphics Processing Unit (GPU) that executes the set of instructions to perform one or more image processing operations.

The memory 204 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 208 includes a set of instructions that are executable by the processor 202 to perform specific actions to manage distribution of tasks. It is understood by a person having ordinary skill in the art that the set of instructions in conjunction with various hardware of the system 200 enable the system 200 to perform various operations. During the execution of instructions, the selection data 222, the distribution data 224, the task data 226, the verification data 228, and the reward data 230 may be accessed by the processor 202.

The communication module 212 receives information pertaining to the one or more crowdsourcing platforms from the requester 112. The information includes a collection of business data with respect to quality, security, and deadline requirements of a crowdsourced business tasks/processes. The communication module 212 stores the collection of these business data in the database server 108.

The selection module 214 retrieves the information stored in the database server 108. The selection module 214 then selects the one or more crowdsourcing arms (hereafter referred to as arms) based on a predefined condition. In an embodiment, the information pertaining to the selected one or more arms are stored in the selection data 222. In an embodiment, selection module 214 selects the one or more arms based on the set of information that include, but are not limited to, a statistical data, a benchmark data, or a user input about the one or more arms based on the collection of business data stored in the database server 108.

The distribution module 216 retrieves the information stored in the selection data 222 pertaining to the one or more arms. The distribution module 216 then assigns a distribution weight W to the selected one or more arms. Further, the distribution module 216 then stores information on the distribution weight W of the selected one or more arms in the distribution data 224. In an embodiment, the distribution weight W is a vector quantity of a probability over the selected arm, wherein the probability of each selected arm is determined based on the selection data 222. In an embodiment, for example, A and B are two selected arms with probabilities ⅔ and ⅓ respectively. These probabilities correspond to the performance of each arm A and B in providing solutions to the same one or more tasks with respect to the parameters (cost, accuracy, and time to completion). The distribution module 216 would decide on the distribution of the one or more tasks (future) among arms A and B based on their respective probability values. In this embodiment, the distribution module 216 may give majority or important set of tasks or all the tasks to arm A. In this embodiment, for example, if Amazon Mechanical Turk (AMT) has an arm at 2 pm on Monday to provide solutions to the one or more tasks and Crowd Flower has an arm at 5 pm on Saturday to provide solutions to the same one or more tasks, then the distribution module 216 finds out the probability of the performance of both the arms with respect to the parameters by looking up the selection data 222 and decide on the distribution of tasks to these arms.

The verification module 218 retrieves information about the selected arms from the distribution data 224 and the task data 226. The verification module 218 then collects information pertaining to the one or more arms from the crowdsourcing platforms servers 106 corresponding to the distribution weight and the task assigned to the one or more arms after the predefined interval has elapsed. The predefined interval is split into parts of time or task (hereafter referred to as rounds).

The collected information is then stored in the verification data 228. In an embodiment, the information pertaining to the one or more arms may include, but is not limited to, results on the solutions for the one or more tasks provided by the arms with respect to parameters explained earlier.

The reward module 220 retrieves the information stored in the verification data 228. The reward module 220 then calculates a reward function on the collection of verification data 228. This is further explained in detail in conjunction with step 316 of FIG. 3. In addition, the reward module 220 stores the results of the reward function in the reward data 230. Further, the reward module 220 then updates the information contained in the selection data 222 and distribution data 224.

In an embodiment, reward module 220 implements one or more of the static probability algorithm, the multiplicative-weight algorithm, or the dynamic task allocation algorithm to calculate and update the reward function.

In an embodiment, the static probability algorithm may be implemented, and is useful when the reward function distribution $F_i$ of the one or more arms does not change between rounds of the predefined interval. In this case, these arms are static. In an embodiment, the static probability algorithm maybe a $\epsilon$-greedy algorithm consisting of choosing one arm at random from the one or more arms with probability $\epsilon$ or choosing the arm with the highest estimated mean reward with probability $1-\epsilon$. The estimated mean is calculated based on the information contained in the verification data 228. The $\epsilon$-greedy algorithm for the one or more static arms does not generate optimal results because the constant factor c prevents the algorithm from getting arbitrarily close to the optimal arm. In another embodiment, the static probability algorithm may be a ϵ-decreasing algorithm where a decreasing value $\epsilon_t$ is used at every step. This ϵ-decreasing algorithm converges to the arm with maximized reward. This ϵ-decreasing algorithm is described in publication by Nicolo Cesa-Bianchi and Paul Fischer titled "Finite-time regret bounds for the multiarmed bandit problem." Proceedings of the International Conference on Machine Learning (ICML), pages 100-108, 1998. An example instruction set for the ϵ-decreasing algorithm is given below which is a variant to the ϵ-greedy algorithm where instead of choosing a single platform with probability ϵ, tasks are distributed proportionally according to ϵ:

```
expected_reward = zeros(1,...,k)
for each t = 1, 2, ...
    eps = 1 / sqrt(t)
    best = argmax(expected_reward)
    for each i = 1, ..., k
        if i == best
            reward = crowdsource(best, (1-eps)T_t)
            expected_reward(i) = ( reward/T_t + expected_reward(i) ) / 2
        else
            reward = crowdsource(i, (eps T_t)/(k-1))
            expected_reward(i) = ( reward/T_t + expected_reward(i) ) / 2
        end
    end
end
```

In another embodiment, the multiplicative-weights algorithm may be used. This multiplicative-weights algorithm is useful when the rewards are arbitrary and an adversary who knows how an algorithm gets to decide the reward at each arm after each round. The multiplicative-weight algorithm guarantees approximately n log k when there are k arms after n rounds. In this case, the rounds n are to be fixed before allocating distribution weight to the one or more arms. The primary drawback to this algorithm is that we must fix n in advance. An unbiased estimator is defined which gives the expected loss of the one or more crowdsourcing platforms associated with the one or more arms, though there is only direct knowledge of the loss of the crowdsourcing platform associated with the selected one or more arms. This estimator then continues to update the probability vector, and may choose different crowdsourcing platforms in the next predefined interval. This algorithm does not split the one or more tasks to the one or more arms, instead determines one arm from a given probability vector and assigns all the tasks to that arm. An example instruction set for the static probability algorithm (or static arm algorithm) is given below:

```
w_1 = (1/k, ..., 1/k)
for each t = 1, 2, ...
    i_t ~= w_t
    loss(t,i_t) = given by adversary
    for each j = 1, ..., k
        if j == i_t
            est_loss(t,j) = loss(t,j) / w_t(j)
        else est_loss(t,j) = 0
        end
        w_{t+1}(i) = w_t(i) exp(-q est_loss(t,j))
        / sum( w_t(j) exp(-q est_loss(t,j)) )
    end
end
```

It is apparent to a person having ordinary skills in the art that above instruction sets are for example purposes and not to limit the scope of the ongoing description.

In yet another embodiment, the dynamic task allocation algorithm may be used which is useful when the distribution of the one or more arms changes with each round, i.e., the reward functions stochastically and gradually change with time. If the difference in the average reward is bounded from one round to another, the dynamic task allocation algorithm can model from a variety of algorithms described in publication by Aleksandrs Slivkins and Eli Upfal, titled "Adapting to a Changing Environment: the Brownian Restless Bandits", Conference on Learning Theory (COLT), 2008 which is herein incorporated by reference.

Figure 3A:
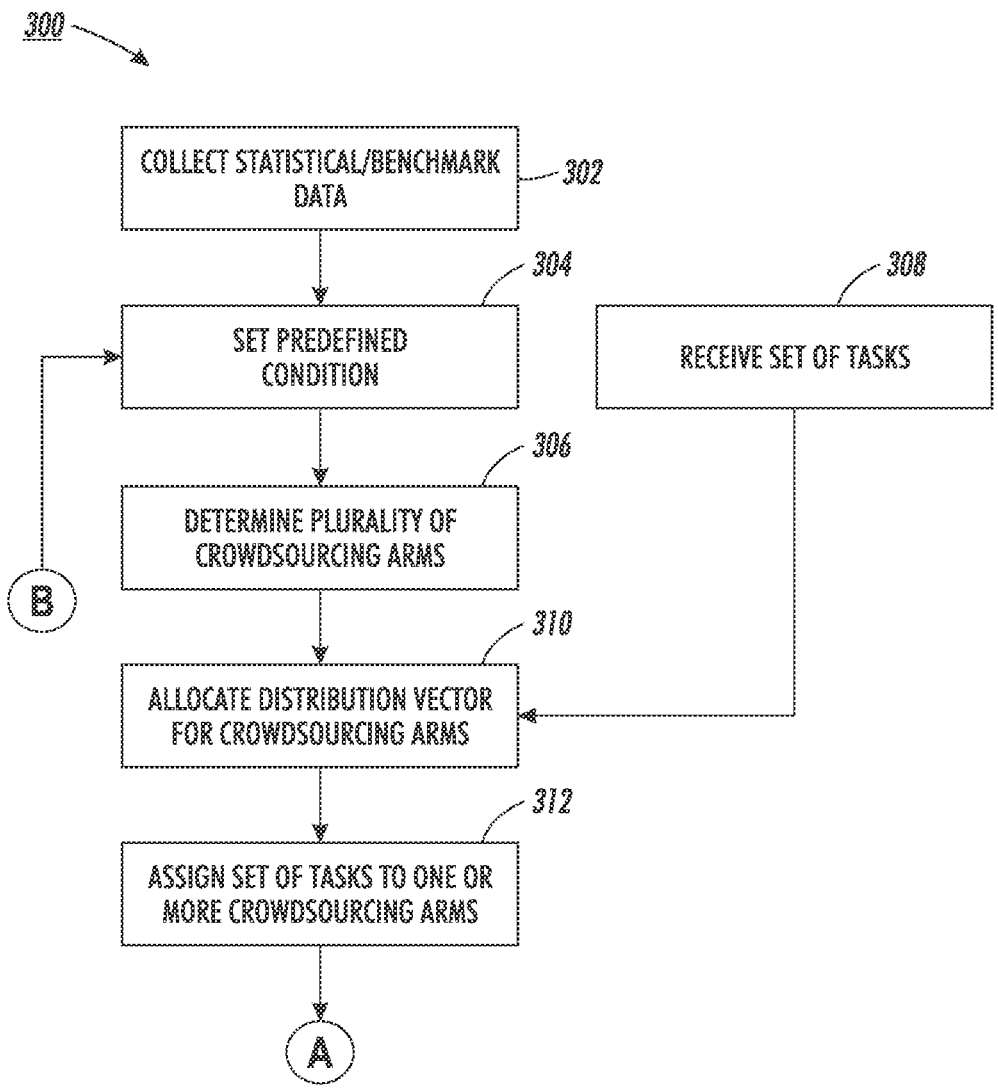
FIGS. 3A and 3B (combined, hereinafter referred to as FIG. 3) is a flow diagram illustrating a method for allocating tasks to one or more crowdsourcing arms, in accordance with at least one embodiment.
Figure 3B:
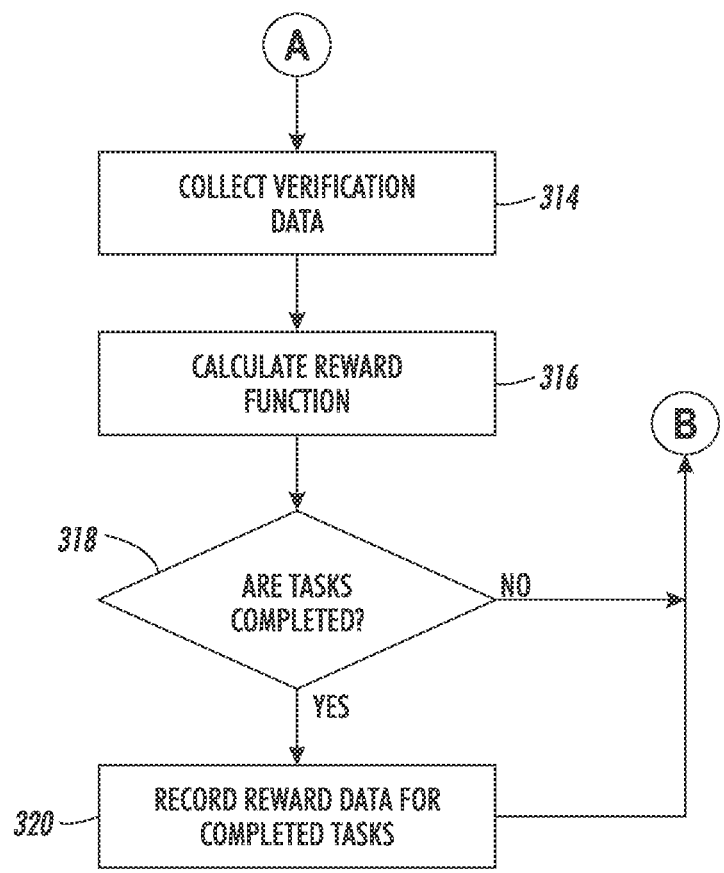

FIG. 3 is a flow diagram illustrating a method for allocating tasks to a plurality of crowdsourcing arms, in accordance with at least one embodiment.

The system 200 has to decide the best arms from the one or more crowdsourcing platforms and proportionately assign one or more set of tasks to maximize a reward.

At step 302, statistical data and/or benchmark data is collected. In an embodiment, the selection module 214 collects statistical data or benchmark data from the database server 114 corresponding to the crowdsourcing platforms. In an embodiment, the statistical data/benchmark data can be used to select the best solution from a range of options on one or more crowdsourcing platforms for a given list of desired parameters (e.g., cost, accuracy, and time to completion) and setting combinations (e.g., payment, currency, geography, etc.).

At step 304, predefined condition is set. In an embodiment, the selection module 214 sets the predefined condition based on the information stored in the database server pertaining to the one or more crowdsourcing platforms. In an embodiment, for example, if the requestor 112 is exploring solutions for the one or more tasks to be considered which cost 2 (two) cents. In this case, 2 cents is a combination of the expected parameter and a preference of currency. The predefined condition is set by exploring all solutions offered by the one or more crowdsourcing platforms for the one or more tasks which offer the best solutions for 2 cents. In this approach, the predefined condition is thus formed using the statistical data or benchmark data.

At step 306, the plurality of crowdsourcing arms are determined. In an embodiment, the selection module 214 determines the one or more tasks based on the predefined condition on the solutions provided by the one or more crowdsourcing platforms. After the exploration, one or more arms are formed out of the best solution from the one or more crowdsourcing platforms based on the predefined condition. In an embodiment, the one or more arms are selected to give maximized reward.

In an embodiment, the behaviour of the one or more arms can be static, wherein the performance of the one or more arms remains constant albeit with changes in setting combinations.

In another embodiment, the behaviour of the one or more arms can be dynamic, wherein the performance of the arm changes over time resulting in differing solutions with respect to the parameters. The rate of change may be known or unknown. The dynamic behaviour may be arbitrary, determined by the adversary, and/or stochastic.

At step 308, one or more tasks are received. In an embodiment, the distribution module 216 receives one or more tasks from the requestor 112. In an embodiment, the one or more tasks can be a variety of short, modular, low-paid tasks such as digitization, data entry, image labelling, translation, and verification. It can also be high-skilled tasks such as programming or innovation. These tasks may subtly change overtime as well, such as digitization of forms filled by people. In an embodiment, the one or more tasks received are such that for which the one or more arms provide reward based on the parameters to be measured. The on-going description is not limited with respect to the type of tasks.

At step 310, the one or more tasks are allocated to the selected one or more arms. In an embodiment, the selected one or more arms are each given a portion of the one or more tasks proportional to the distribution weight W. In an embodiment, the distribution weight W is a vector quantity of probability over the selected arms, wherein the probability of an arm being chosen is proportional to this weight. A random allocation could be done all at once (choose an arm at random proportional to W and assign all tasks to that arm), or could be done on a task-by-task basis (for each task, choose an arm at random proportional to W and assign it to that arm, repeat for other tasks).

At step 312, the one or more tasks are assigned to the one or more arms. In an embodiment, the one or more tasks are assigned to the one or more arms based on their distribution weight W. The rewards of the one or more arms are random, wherein the same task assigned to the same arm may have variation in performance due to the changes in the solutions offered by the one or more arms, such as changing nature of the crowdworkers. Though the rewards calculated using the reward function change it can be normalized to form a single value of reward R, where $R \sim F_i$ over a reward function distribution range [0, 1] for the one or more tasks that are considered. Each time during this step 312, the distribution vector $W^t \epsilon [0,1]^k$, wherein t represents the weight distribution at a given time. i represents the arm under consideration for allocating distribution weight. The reward function distribution normalizes the reward function. The one or more arms are represented by the set $\{1, 2, \ldots, k\}$. The distribution vector is represented by $\Sigma_{i=1}^{k} w_i^t = 1$. Further the one or more tasks T for a certain predefined interval t are assigned to each arm by using either of the methods listed below.

1. Assigning $w_i^t T_t$ tasks to platform i.
2. Assigning each of the tasks $T_j$ to platform i with probability according to Wt, wherein j represents an intermediate set of tasks from the one or more tasks.
3. Assigning all the tasks $T_t$ to platform i with probability according to Wt.

At step 314, the verification data is collected. In an embodiment, the one or more arms accepts one or more tasks from the requester 112 and the one or more crowdsourcing platforms associated with the one or more tasks sends information about the performance of the one or more tasks which is stored in the verification data 230. Examples of the information about the performance stored in the verification data 230 includes, but are not limited to, cost, accuracy, time to completion, and other measurable parameters.

At step 316, the reward function is calculated. In an embodiment, the reward or the result of the assignment of the one or more tasks and their corresponding arms is calculated by the reward module 220 using the reward function. In an embodiment, the reward function is calculated using at least of one of the static probability algorithm, the multiplicative-weight algorithm, or the dynamic task allocation algorithm.

At step 318, the one or more tasks are checked for completion. In an embodiment, if it is yes then the reward is recorded based on the calculation in step 316. If the one or more tasks are yet to be complete (i.e., before the predefined interval is elapsed) then the remaining tasks are taken up.

At step 320, the reward data for the completed tasks are recorded. In an embodiment, the predefined condition is updated by changing the distribution weight Wt for the remaining tasks from T based on the reward generated in the completion of the previous tasks. In an embodiment, after the predefined condition is updated the distribution weight Wt would be such that it puts more weight on arms with good performance, and less weight on arms with poor performance.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as, a floppy disk drive, optical disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to an automatic and an adaptive method to determine the one or more arms and the corresponding assignment of the one or more tasks based on the predefined condition. The methods and system helps in maximizing the rewards for the one or more tasks assigned to one or more arms by putting more distribution weight on the one or more arms with good performance, and less weight on the one or more with poor performance. The information contained in verification data are automatically collected from the one or more crowdsourcing platforms. Thus apart from an initial setup cost, the methods and system for allocating of tasks to the arms can be operational with no additional cost. Additionally, the methods and system would learn, adapt, and perform in a changing environment to dynamically allocate the tasks.

Various embodiments of the methods and systems for managing allocation of tasks to one or more arms have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for managing allocation of tasks to a plurality of crowdsourcing arms, the computer-implemented method comprising:
    categorizing one or more crowdsourcing platforms in the plurality of crowdsourcing arms based on requester preferences and one or more performance parameters of each of the one or more crowdsourcing platforms, wherein each of the plurality of crowdsourcing arms comprises a plurality of crowdworkers;
    allocating, to the plurality of crowdsourcing arms, a distribution vector comprising one or more weights for a predefined interval, wherein the one or more weights are indicative of a performance of each of the plurality of crowdsourcing arms on one or more previous tasks;
    distributing a set of tasks to the plurality of crowdsourcing arms based on the one or more weights of each of the plurality of crowdsourcing arms;
    receiving, after the predefined interval has elapsed, information pertaining to a current performance of each of the plurality of crowdsourcing arms executing one or more tasks from the set of tasks;
    updating the one or more weights of each of the plurality of crowdsourcing arms based on the respective current performance of each of the plurality of crowdsourcing arms, wherein the updating comprises increasing the one or more weights if the current performance is greater than the performance during the predefined interval and decreasing the one or more weights if the current performance is less than the performance during the predefined interval; and
    re-distributing one or more pending tasks in the set of tasks among the plurality of crowdsourcing arms based on the updated one or more weights.

2. The computer-implemented method according to claim 1, wherein the one or more weights are determined based on at least one of benchmark data, statistical data retrieved from the one or more crowdsourcing platforms, or a user input.

3. The computer-implemented method according to claim 1, wherein a performance of each of the plurality of crowdsourcing arms corresponds to at least one parameter associated with the respective performance, wherein the at least one parameter comprises cost, accuracy, or time to completion.

4. The computer-implemented method according to claim 3 further comprising calculating a reward function for the at least one parameter, wherein the reward function is calculated using at least of one of a static probability algorithm, a multiplicative-weight algorithm, or a dynamic task allocation algorithm.

5. The computer-implemented method according to claim 1, wherein the predefined interval corresponds to at least one of a time interval or a task interval.

6. The system of claim 1, wherein the distribution vector allocated to each crowdsourcing arm comprises a probability corresponding to a performance of each of the plurality crowdsourcing arms on one or more previous tasks, and each of the plurality of crowdsourcing arms is distributed a portion of the set of tasks based on the probability for the crowdsourcing arm.

7. A computer-implemented method for managing allocation of tasks to a plurality of crowdsourcing arms, the computer-implemented method comprising:
    categorizing one or more crowdsourcing platforms in the plurality of crowdsourcing arms based on requester preferences and one or more performance parameters of each of the one or more crowdsourcing platforms, wherein each of the plurality of crowdsourcing arms comprises a plurality of crowdworkers;
    allocating, to the plurality of crowdsourcing arms, a distribution vector comprising one or more weights to each of the plurality of crowdsourcing arms, wherein the one or more weights are indicative of a performance of each of the plurality crowdsourcing arms on one or more previous tasks;

assigning a set of tasks to the plurality of crowdsourcing arms based on the one or more weights of each of the plurality of crowdsourcing arms;

collecting, after a predefined interval has elapsed, information pertaining to a current performance of each of the plurality of crowdsourcing arms executing one or more tasks from the set of tasks;

calculating a reward function using the information pertaining to the current performance of the plurality of crowdsourcing arms;

updating the one or more weights of each of the plurality of crowdsourcing arms based on the calculated reward function, wherein the updating comprises increasing the one or more weights if the reward function pertaining to the current performance is greater than a reward function pertaining to the performance during the predefined interval and decreasing the one or more weights if the reward function pertaining to the current performance is less than a reward function pertaining to the performance during the predefined interval; and re-distributing one or more pending tasks in the set of tasks among the plurality of crowdsourcing arms based on the updated one or more weights.

8. The computer-implemented method according to claim 7, wherein the one or more weights are determined based on at least one of benchmark data, statistical data retrieved from the one or more crowdsourcing platforms associated with the plurality of crowdsourcing arms, or a user input.

9. The computer-implemented method according to claim 7, wherein the performance of the plurality of crowdsourcing arms corresponds to at least parameter comprises cost, accuracy, or time to completion.

10. The computer-implemented method according to claim 7, wherein the reward function is calculated using at least of one of a static probability algorithm, a multiplicative-weight algorithm, or a dynamic task allocation algorithm.

11. The computer-implemented method according to claim 7, wherein the predefined interval corresponds to at least one of a time interval or a task interval.

12. A system for managing allocation of tasks to a plurality of crowdsourcing arms, the system comprising:

one or more processors configured to:

categorize one or more crowdsourcing platforms in the plurality of crowdsourcing arms based on requester preferences and one or more performance parameters of each of the one or more crowdsourcing platforms, wherein each of the plurality of crowdsourcing arms comprises a plurality of crowdworkers;

allocate, to the plurality of crowdsourcing arms, a distribution vector comprising one or more weights for a predefined interval, wherein the one or more weights are indicative of a performance of each of the plurality of crowdsourcing arms on one or more previous tasks;

distribute a set of tasks to the plurality of crowdsourcing arms based on the one or more weights of each of the plurality of crowdsourcing arms;

receive, after the predefined interval has elapsed, information pertaining to a current performance of each of the plurality of crowdsourcing arms executing one or more tasks from the set of tasks;

update the one or more weights of each of the plurality of crowdsourcing arms based on the respective current performance of each of the plurality of crowdsourcing arms, wherein the updating comprises increasing the one or more weights if the current performance is greater than the performance during the predefined interval and decreasing the one or more weights if the current performance is less than the performance during the predefined interval; and re-distribute one or more pending tasks in the set of tasks among the plurality of crowdsourcing arms based on the updated one or more weights.

13. The system of claim 12, wherein the updating of the one or more weights of each of the plurality of crowdsourcing arms is based on a set of reward functions determined using the information pertaining to the current performance of the respective crowdsourcing arm of the plurality of crowdsourcing arms.

14. The system of claim 12, wherein a performance of each of the plurality of crowdsourcing arms corresponds to at least one parameter associated with accuracy, or time to completion.

15. The system of claim 12, wherein the one or more processors are further configured to select the plurality of crowdsourcing arms from the one or more crowdsourcing platforms based on the one or more weights of each of the plurality of crowdsourcing arms.

16. The system of claim 12, wherein the one or more processors are further configured to:

receive the set of tasks to be crowdsourced from a computing device; and forward the set of tasks to the plurality of crowdsourcing arms.

17. The system of claim 16, wherein the one or more processors are further configured to send the information pertaining to the current performance of each of the plurality of crowdsourcing arms to the computing device.

18. A computer program product for use with a computing device, the computer program product comprising a non-transitory computer readable medium, the non-transitory computer readable medium stores a computer program code for managing allocation of tasks to a plurality of crowdsourcing arms, the computer program code is executable by one or more processors in the computing device to:

categorize one or more crowdsourcing platforms in the plurality of crowdsourcing arms based on requester preferences and one or more performance parameters of each of the one or more crowdsourcing platforms, wherein each of the plurality of crowdsourcing arms comprises a plurality of crowdworkers;

allocate, to the plurality of crowdsourcing arms, a distribution vector comprising one or more weights for a predefined interval, wherein the one or more weights are indicative of a performance of each of the plurality of crowdsourcing arms on one or more previous tasks;

distribute a set of tasks to the plurality of crowdsourcing arms based on the one or more weights of each of the plurality of crowdsourcing arms;

receive, after the predefined interval has elapsed, information pertaining to a current performance of each of the plurality of crowdsourcing arms executing one or more tasks from the set of tasks;

update the one or more weights of each of the plurality of crowdsourcing arms based on the respective current performance of each of the plurality of crowdsourcing arms, wherein the updating comprises increasing the one or more weights if the current performance is greater than the performance during the predefined interval and decreasing the one or more weights if the current performance is less than the performance during the predefined interval; and re-distribute one or more pending tasks in the set of tasks among the plurality of crowdsourcing arms based on the updated one or more weights.

* * * * *